United States Patent
Larue et al.

(10) Patent No.: US 9,266,066 B2
(45) Date of Patent: Feb. 23, 2016

(54) MEMBRANE WITH LOCALIZED ASYMMETRIES

(71) Applicant: Pall Corporation, Port Washington, NY (US)

(72) Inventors: Geoffrey Patrick Larue, Gulf Breeze, FL (US); Xiaosong Wu, Pensacola, FL (US); Martin Smith, Northport, NY (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 13/680,155

(22) Filed: Nov. 19, 2012

(65) Prior Publication Data
US 2013/0146539 A1 Jun. 13, 2013

Related U.S. Application Data

(60) Provisional application No. 61/569,993, filed on Dec. 13, 2011.

(51) Int. Cl.
  *B01D 69/02* (2006.01)
  *B01D 61/18* (2006.01)
  (Continued)

(52) U.S. Cl.
  CPC .............. *B01D 61/18* (2013.01); *B01D 61/147* (2013.01); *B01D 65/08* (2013.01);
  (Continued)

(58) Field of Classification Search
  CPC ........ B01D 69/02; B01D 69/04; B01D 69/06; B01D 69/08; B01D 69/082; B01D 69/10; B01D 69/12; B01D 69/122; B01D 69/125; B01D 71/06; B01D 71/10–71/22; B01D 2325/022; B01D 2325/023; B01D 2325/06; B01D 2325/08

USPC .......... 210/500.1, 500.21, 500.24, 506, 510.1
  See application file for complete search history.

(56) References Cited

U.S. PATENT DOCUMENTS

| | | | |
|---|---|---|---|
| 4,483,771 A | 11/1984 | Koch | |
| 4,933,081 A | 6/1990 | Sasaki et al. | |
| 5,120,594 A | 6/1992 | Mrozinski | |
| 5,490,937 A * | 2/1996 | van Reis | 210/637 |
| 5,886,059 A | 3/1999 | Wang | |

(Continued)

FOREIGN PATENT DOCUMENTS

| | | |
|---|---|---|
| DE | 100 58 258 A1 | 8/2002 |
| DE | 10 2006 010 831 A1 | 9/2007 |

(Continued)

OTHER PUBLICATIONS

Extended European Search Report, Application No. 12195945.6, dated Apr. 2, 2013.

(Continued)

*Primary Examiner* — David C Mellon
*Assistant Examiner* — Pranav Patel
(74) *Attorney, Agent, or Firm* — Leydig, Voit & Mayer

(57) ABSTRACT

Asymmetric microporous membranes with localized asymmetries, devices including the membranes, and methods of making and using the membranes, are disclosed. The asymmetric microporous membranes have a first surface and a second surface and an interior bulk defined by the first and second surfaces, wherein the first surface has at least a first region and a second region, the first region having a first porosity comprising a first mean pore size, and the second region having a second porosity comprising a second mean pore size, wherein the ratio of first mean pore size to the second mean pore size is at least about 5:1.

20 Claims, 9 Drawing Sheets

(51) Int. Cl.
*B01D 61/14* (2006.01)
*B01D 65/08* (2006.01)
*B01D 67/00* (2006.01)
*B01D 71/10* (2006.01)
*B01D 71/34* (2006.01)
*B01D 71/68* (2006.01)
*B29C 47/00* (2006.01)
*B29C 47/02* (2006.01)
*B29C 47/06* (2006.01)
*B29K 105/04* (2006.01)

(52) U.S. Cl.
CPC .......... *B01D 67/0013* (2013.01); *B01D 69/02* (2013.01); *B01D 71/10* (2013.01); *B01D 71/34* (2013.01); *B01D 71/68* (2013.01); *B29C 47/0021* (2013.01); *B29C 47/025* (2013.01); *B29C 47/065* (2013.01); *B01D 2321/168* (2013.01); *B01D 2321/2008* (2013.01); *B01D 2325/02* (2013.01); *B01D 2325/022* (2013.01); *B01D 2325/06* (2013.01); *B01D 2325/08* (2013.01); *B01D 2325/14* (2013.01); *B01D 2325/16* (2013.01); *B01D 2325/48* (2013.01); *B29K 2105/041* (2013.01)

(56) References Cited

U.S. PATENT DOCUMENTS

| | | | |
|---|---|---|---|
| 5,895,573 A * | 4/1999 | Scharstuhl | 210/321.87 |
| 5,906,742 A | 5/1999 | Wang et al. | |
| 6,110,369 A | 8/2000 | Ditter et al. | |
| 6,479,072 B1 | 11/2002 | Morgan et al. | |
| 6,627,291 B1 | 9/2003 | Clark et al. | |
| 7,208,200 B2 | 4/2007 | Kools | |
| 7,393,391 B2 | 7/2008 | Lopez et al. | |
| 7,531,120 B2 | 5/2009 | Van Rijn et al. | |
| 7,560,025 B2 | 7/2009 | Kools | |
| 7,959,780 B2 | 6/2011 | Hawkins et al. | |
| 8,309,265 B2 | 11/2012 | Miyauchi et al. | |
| 2003/0192826 A1 | 10/2003 | Wang et al. | |
| 2004/0028875 A1 | 2/2004 | Van Rijn et al. | |
| 2005/0011834 A1 | 1/2005 | Wang et al. | |
| 2006/0016685 A1 | 1/2006 | Hawkins et al. | |
| 2007/0084794 A1 | 4/2007 | Morikawa et al. | |
| 2008/0197072 A1 | 8/2008 | Ansorge et al. | |
| 2009/0178969 A1 | 7/2009 | Hanakawa et al. | |
| 2010/0065490 A1 | 3/2010 | Balster et al. | |
| 2010/0112199 A1 | 5/2010 | McClure et al. | |
| 2010/0129720 A1 | 5/2010 | Sako et al. | |
| 2011/0091698 A1 * | 4/2011 | Zhou et al. | 428/212 |
| 2011/0094960 A1 | 4/2011 | Zhou et al. | |
| 2011/0297612 A1 | 12/2011 | Hester et al. | |

FOREIGN PATENT DOCUMENTS

| | | | |
|---|---|---|---|
| DE | 10 2006 036 863 A1 | 2/2008 | |
| EP | 1 609 522 A2 | 12/2005 | |
| EP | 2 366 449 A2 | 9/2011 | |
| JP | H03-065223 A2 | 3/1991 | |
| JP | 2002-543971 A | 12/2002 | |
| JP | 2003-509232 A | 3/2003 | |
| JP | 2005-522316 A | 7/2005 | |
| JP | 2010-214228 A | 9/2010 | |
| JP | 2011-212545 A | 10/2011 | |
| JP | 2011-526830 A | 10/2011 | |
| KR | 2011-0112825 A | 10/2011 | |
| WO | WO 00/69549 A1 | 11/2000 | |
| WO | WO 01/19505 A2 | 3/2001 | |
| WO | WO 02/34375 A1 | 5/2002 | |
| WO | WO 02/058828 A1 | 8/2002 | |
| WO | WO 02/072248 A1 | 9/2002 | |
| WO | WO2010002501 | * | 1/2010 |
| WO | WO2010078234 | * | 7/2010 |

OTHER PUBLICATIONS

Bikel, M., et al., "Phase Separation Microfabrication" *ICOM 2008*.

Bikel et al., *ICOM 2008*, "Phase Separation Microfabrication" Abstract.

Bikel et al., *Journal of Membrane Science*, "Shrinkage effects during polymer phase separation on microfabricated molds", 347 (2010), pp. 141-149.

Bikel et al., *Journal of Membrane Science*, "Polymeric microsieves via phase separation microfabrication: Process and design optimization", 347 (2010), pp. 93-100.

Bikel et al., *Applied Metals and Interfaces*, "Micropatterned Polymer Films by Vapor-Induced Phase Separation Using Permeable Molds", vol. 1, No. 12 (2010), pp. 2856-2861.

Patent Examination Report, Australian Application No. 2012274016, dated Jul. 26, 2013.

Notice of Reasons for Rejection, Japanese Application No. P2012-272744, dated Oct. 29, 2013.

Notice of Non-Final Rejection, Korean Application No. 10-2012-0144330 dated Feb. 10, 2014.

Examination Report, Australian Application No. 2012274016 dated Mar. 11, 2014.

International Search Report, Singapore Application No. 201209026-2, dated Aug. 29, 2013.

* cited by examiner

MEMBRANE WITH LOCALIZED ASYMMETRIES

CROSS-REFERENCE TO RELATED APPLICATIONS

This patent application claims the benefit of U.S. Provisional Patent Application No. 61/569,993, filed Dec. 13, 2011, which is incorporated by reference.

BACKGROUND OF THE INVENTION

A variety of symmetric (isotropic) and asymmetric (anisotropic) microporous membranes are known. Symmetric membranes have a pore structure (e.g., a mean pore size) that is substantially the same through the membrane from one surface to the other. Asymmetric microporous membranes have a pore structure (e.g., a mean pore size) that varies through the membrane, typically, increasing in size from one surface of the membrane to the other surface. Another type of asymmetric membrane has a pore structure resembling an hourglass shape, decreased at a position within the thickness of the membrane and increased at the opposing surfaces.

However, there is a need for membranes that maintain a desired level of flux for a desired period of time for certain applications. These and other advantages of the present invention will be apparent from the description as set forth below.

BRIEF SUMMARY OF THE INVENTION

An embodiment of the invention provides an asymmetric microporous membrane with localized asymmetries, the membrane having a first surface and a second surface, wherein one portion of the first surface has a first pore structure, and another portion of the first surface has a second pore structure, wherein the second pore structure differs from the first pore structure. The second surface can have a pore structure that differs from the pore structure of the portions of the first surface or a pore structure that is substantially the same as that of a portion of the first surface.

The membrane has a porous bulk between the first surface and the second surface. In accordance with embodiments of the invention, the thickness of the bulk between the first portion of the first surface and the second surface differs from the thickness of the bulk between the second portion of the first surface and the second surface, or the thickness of the bulk between the first portion of the first surface and the second surface is the same as, or substantially the same as, the thickness of the bulk between the second portion of the first surface and the second surface.

In another embodiment, a method of making a membrane having localized asymmetries is provided, the method comprising (a) obtaining a template having a predetermined geometry complementary to the localized asymmetries; (b) preconditioning the template with a preconditioning material; (c) depositing a polymer solution over the preconditioned template; (d) optionally depositing one or more polymer solutions over the previously deposited polymer solution; (e) precipitating the deposited polymer solution(s); and (f) separating the membrane from the template.

Another embodiment for making a membrane having localized asymmetries comprises (a) obtaining a template; (b) preconditioning the template with a preconditioning material to provide casting surface having a predetermined geometry complementary to the localized asymmetries; (c) depositing a polymer solution over the preconditioned template; (d) optionally depositing one or more polymer solutions over the previously deposited solution; (e) precipitating the deposited polymer solution(s); and (f) separating the membrane from the template.

In some embodiments of the methods of making the membrane, the method further comprises (h) leaching the membrane and/or (g) drying the membrane.

In other embodiments, methods of processing a fluid comprise passing a fluid tangentially to the first or second surface of the membrane, passing a fluid from the first surface of the membrane through the second surface of the membrane, and passing a fluid from the second surface of the membrane through the first surface of the membrane.

BRIEF DESCRIPTION OF THE SEVERAL VIEWS OF THE DRAWING(S)

FIG. 1 is a cross-sectional view of a membrane according to an embodiment of the present invention, showing first and second portions of the first surface of the membrane, the two portions having different pore structures, wherein the thickness of the membrane between a first portion of the first surface and the second surface differs from the thickness of the membrane between a second portion of the first surface and the second surface.

Figure 4:
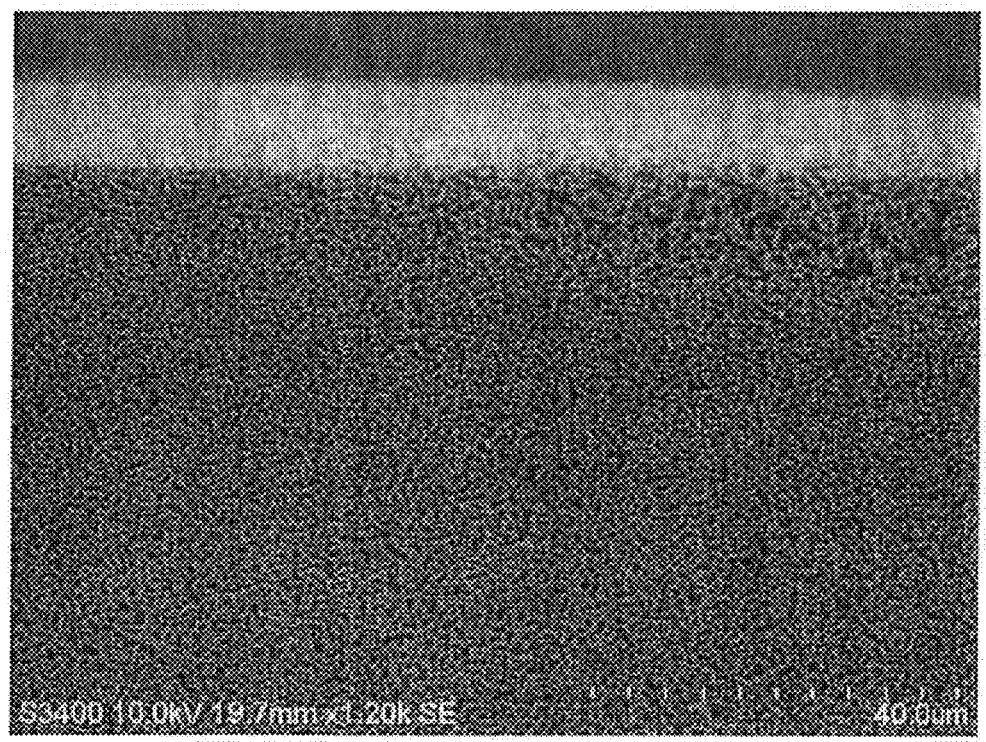

FIG. 4 is a cross-sectional view of a membrane according to an embodiment of the present invention, showing first and second portions of the first surface of the membrane, the two portions having different pore structures, wherein the thickness of the membrane between a first portion of the first surface and the second surface is substantially the same as the thickness of the membrane between a second portion of the first surface and the second surface.

Figure 5:
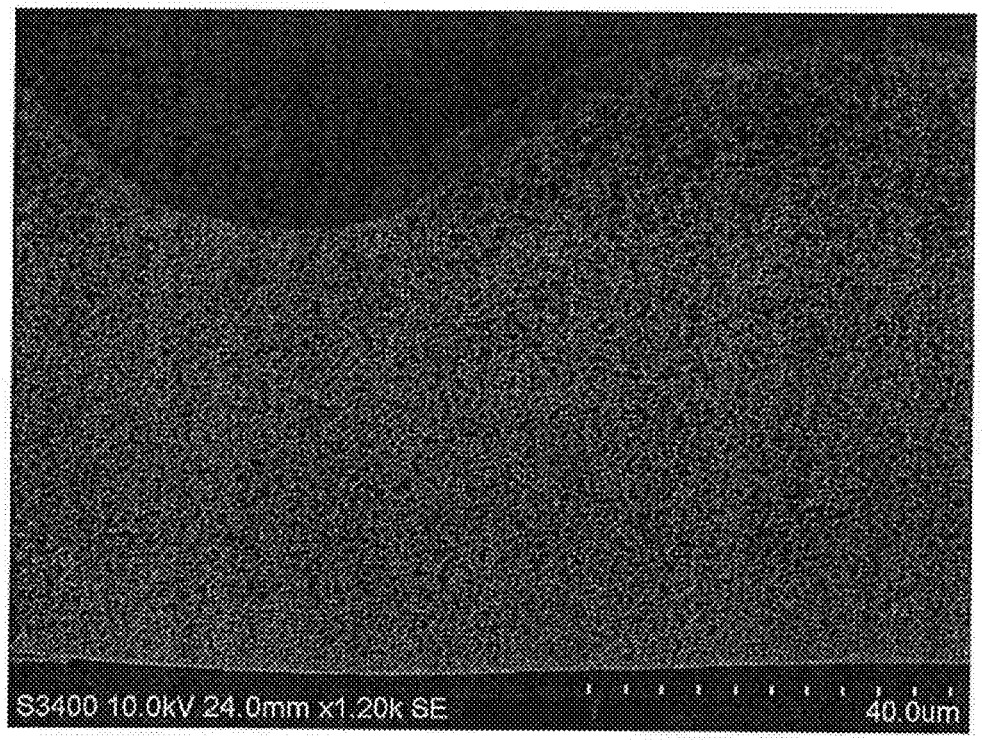

FIG. 5 is a cross-sectional view of a membrane according to another embodiment of the present invention, showing the top surface in particular.

Figure 6:
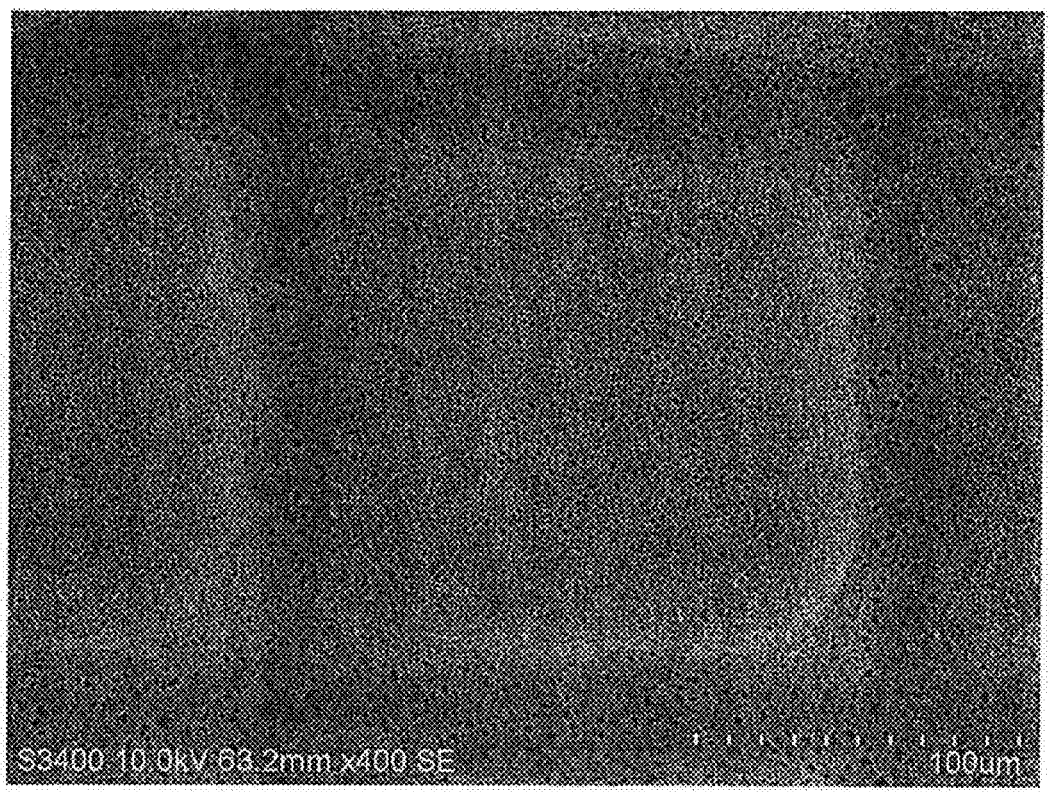

FIG. 6 is a top view of a portion of a top surface of a membrane according to another embodiment of the present invention.

Figure 7:
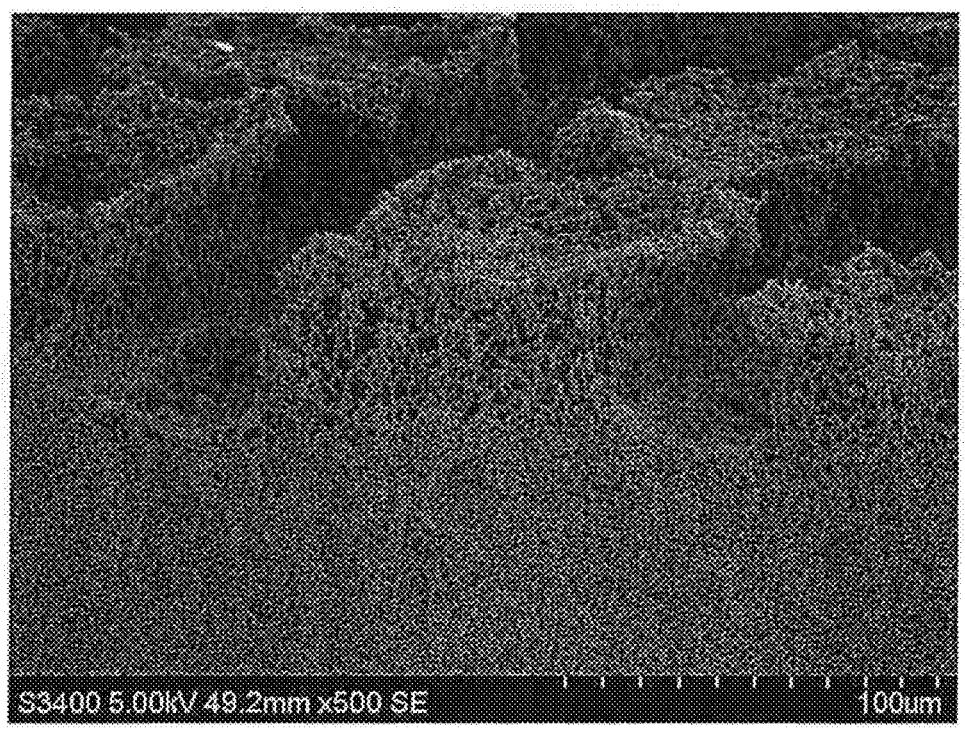

FIG. 7 is a cross-sectional view of a membrane according to another embodiment of the present invention, showing the top surface in particular.

Figure 8:
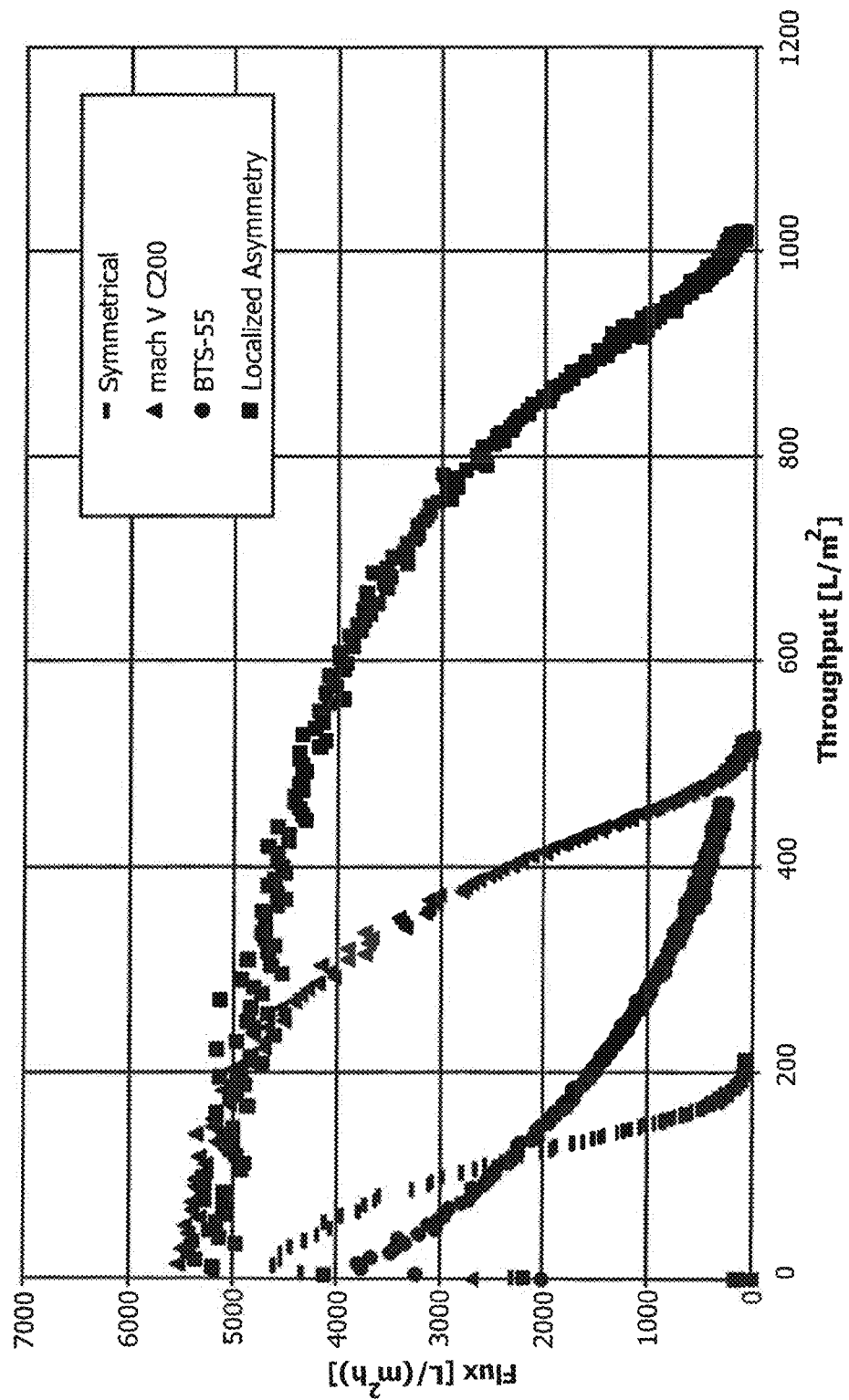

FIG. 8 shows the BSA flux versus throughput for various membranes, including a membrane according to an embodiment of the invention.

Figure 9:
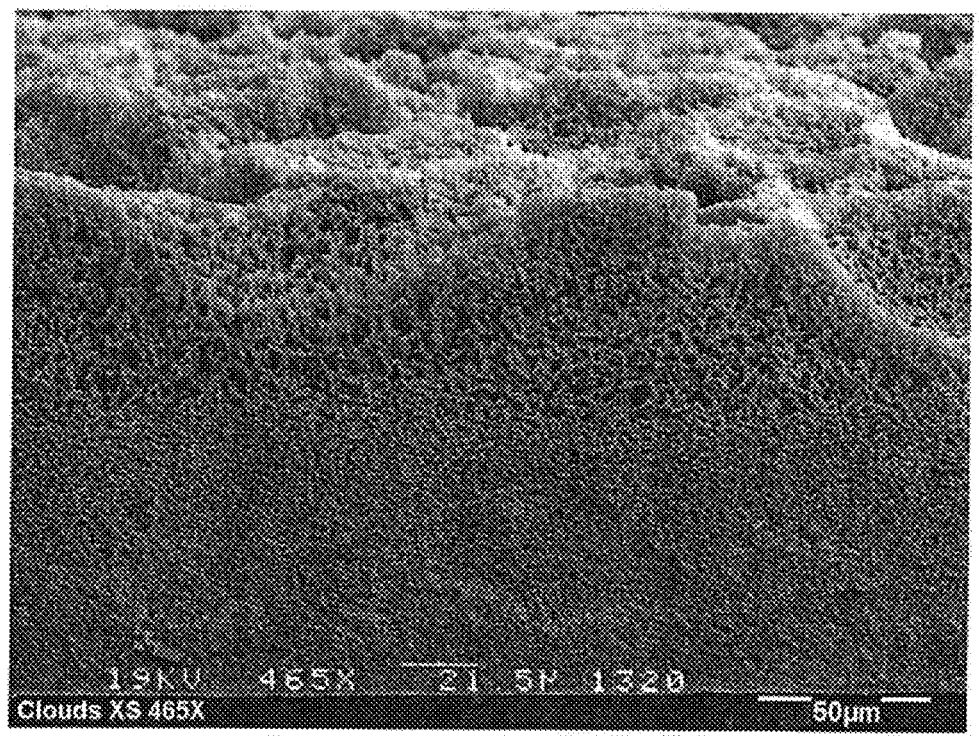

FIG. 9 is a cross-sectional view of a dual-cast membrane according to another embodiment of the present invention.

DETAILED DESCRIPTION OF THE INVENTION

Advantageously, membranes with localized asymmetries have greater resistance to fouling than conventional symmetric membranes and conventional asymmetric membranes.

An embodiment of the invention provides an asymmetric microporous membrane with localized asymmetries, the membrane having a first surface and a second surface, wherein a first portion of the first surface has a first pore structure, and a second portion of the first surface has a second pore structure, wherein the second pore structure differs from the first pore structure. The second surface can have a pore structure that differs from the pore structure of the portions of the first surface or a pore structure that is substantially the same as that of a portion of the first surface. The membrane has a porous bulk between the first surface and the second surface. In some embodiments, the thickness of the bulk between the first portion of the first surface and the second surface is the same as, or substantially the same as, the thickness of the bulk between the second portion of the first surface and the second surface. In some other embodiments, the thickness of the bulk between the first portion of the first surface and the second surface differs from the thickness of the bulk between the second portion of the first surface and the second surface. For example, in one embodiment, the thickness between the first portion of the first surface and the second surface is at least about 10% greater than the thickness between the second portion of the first surface and the second surface, in other embodiments, the thickness between the first portion of the first surface and the second surface is at least about 15%, or at least about 30%, greater than the thickness between the second portion of the first surface and the second surface. Preferably, in those embodiments wherein the thickness between the first portion of the first surface and the second surface is at greater than the thickness between the second portion of the first surface and the second surface, the thickness between the first portion of the first surface and the second surface is in the range of from about 10% to about 50% greater than the thickness between the second portion of the first surface and the second surface In one embodiment, a membrane having localized asymmetries is provided, the membrane comprising an asymmetric microporous membrane comprising a first surface and a second surface and an interior bulk defined by the first and second surfaces, wherein the first surface has at least a first portion and a second portion, the first portion having a first pore structure extending from the first portion into the interior bulk, and the second portion having a second pore structure extending from the second portion into the interior bulk, wherein the first pore structure at the surface differs from the second pore structure at the surface by a factor of at least about two. For example, the ratio of the first pore structure to the second pore structure can be in the range of from about 3:1, to about 75:1, or more.

An asymmetric microporous membrane according to another embodiment of the invention comprises a first surface and a second surface and an interior bulk defined by the first and second surfaces, wherein the first surface has at least a first portion and a second portion, the first portion having a first porosity comprising a first mean pore size, and the second portion having a second porosity comprising a second mean pore size pore size, wherein the first pore size is at least two times greater than the second pore size. For example, the ratio of the first mean pore size to the second mean pore size can be in the range of from about 3:1, to about 75:1, or more. Typically, the ratio of the first mean pore size to the second mean pore size is at least about 5:1, preferably, the ratio is at least about 10:1, more preferably, the ratio is at least about 25:1, for example, at least about 40:1, or at least about 50:1, or at least about 60:1.

The second surface can have a pore structure that differs from the pore structure of the portions of the first surface, or the second surface can have a pore structure that is substantially the same as that of a portion of the first surface. For example, the second surface can have a third porosity, comprising a third mean pore size, wherein the third mean pore size is at least about 10 times less than the first mean pore size and/or the third mean pore size is at least about two times less than the second mean pore size. Typically, the ratio of the second mean pore size of the first surface to the mean pore size of the second surface is at least about 2:1, preferably, the ratio of the second mean pore size of the first surface to the mean pore size of the second surface is at least about 25:1, more preferably, the ratio is at least about 50:1, for example at least about 100:1, at least about 125:1, or at least about 140:1. Typically, the ratio of the first mean pore size of the first surface to the mean pore size of the second surface is at least about 5:1, preferably, the ratio of the first mean pore size of the first surface to the mean pore size of the second surface is at least about 15:1, more preferably, the ratio is at least about 75:1, for example at least about 100:1, or at least about 150:1. In some embodiments, the ratio of the mean pore size of the first or the second portion of the first surface to the mean pore size of the second surface is about 500:1 or more, or about 700:1 or more, or 1000:1, or more, e.g., wherein the first mean pore size of the first portion of the first surface is about 20 to about 30 micrometers and the second surface has an absolute virus retentive mean pore size.

Typically, the mean pore size of the second surface is substantially the same across the second surface. However, in some embodiments, the second surface can have portions with different mean pore sizes.

Embodiments of the membrane can have at least one desired function and/or desired characteristic, such as, for example, an antimicrobial function and/or a charge. In some embodiments, one portion of the membrane (e.g., near and/or at one surface of the membrane) can have a higher concentration of the desired function(s) and/or characteristic(s) than the rest of the membrane.

In another embodiment, a method of making a membrane having localized asymmetries is provided, the method comprising (a) obtaining a template having a predetermined geometry complementary to the localized asymmetries; (b) applying a preconditioning material (preferably, a preconditioning fluid) to the template to provide a preconditioned template; (c) casting a polymer solution over the preconditioned template; (d) optionally casting one or more casting solutions over the previously cast solution; (e) precipitating the cast polymer solution(s) to provide a membrane; and (f) separating the membrane provided by precipitating the cast polymer solution(s) from the template. Optionally, the method further comprises (g) leaching the membrane and/or (h) drying the membrane. In those embodiments of the method including leaching the membrane, the membrane can be separated from the template before or after leaching.

Another embodiment for making a membrane having localized asymmetries comprises (a) obtaining a template; (b) applying a preconditioning material (preferably, a preconditioning fluid) in a pattern (preferably, a predetermined pattern) to the template to provide a preconditioned template having a predetermined geometry complementary to the localized asymmetries; (c) casting a polymer solution over the preconditioned template; (d) optionally casting one or more polymer solutions over the previously cast solution; (e) precipitating the cast polymer solution(s) to provide a membrane; and (f) separating the membrane provided by precipitating the cast polymer solution(s) from the template. Optionally, the method further comprises (g) leaching the membrane and/or (h) drying the membrane. In those embodiments of the method including leaching the membrane, the membrane can be separated from the template before or after leaching.

In some embodiments of the method, the preconditioning material includes at least one component for providing one or more desired functions and/or characteristics to the membrane.

Embodiments of the invention also include devices comprising the membranes, and methods of using the membranes, e.g., to process fluid.

In some embodiments, methods of processing a fluid comprise passing a fluid tangentially to the first or tangentially to the second surface of the membrane, passing a fluid from the first surface of the membrane through the second surface of the membrane, and passing a fluid from the second surface of the membrane through the first surface of the membrane.

The membranes according to the invention can be made by coating a preconditioned template substrate (wherein the template substrate has a geometry complementary to the desired localized asymmetries in the membrane to be produced and a preconditioning material is applied to the template substrate) with one or more polymer solutions, and curing the coated template substrate, or wherein a preconditioning material is applied in a pattern (e.g., in a predetermined pattern) to the template substrate (preferably, wherein the template substrate has a flat surface), and coated with one or more polymer solutions, and the coated template substrate is cured.

A variety of materials are suitable for use as template substrates, for example, the template substrate (which can be hydrophilic or hydrophobic) can be made of a fabric (woven or non-woven), embossed foil, metal screen, extruded mesh, textured rubber, embossed polymer film, and various polymer materials. In those embodiments wherein the templates have openings passing from one surface to another, particularly templates comprising open meshes, the templates can be covered, closed and/or sealed on one side before applying the preconditioning material, to allow for more efficient preconditioning of the template.

The template substrate is preconditioned with a preconditioning material before coating the substrate with the polymer solution.

Typically, the preconditioning material includes a non-volatile component, wherein the non-volatile component has a boiling point of 80° C. or greater at ambient temperature and 1 atmosphere of pressure. Preferably, the non-volatile component has a boiling point of about 100° C. or greater at ambient temperature and 1 atmosphere of pressure. In some embodiments, the preconditioning material comprises a volatile component in addition to the non-volatile component, wherein the volatile component has a boiling point of less than 80° C. at ambient temperature and 1 atmosphere of pressure.

Typically, the preconditioning material comprises a preconditioning fluid, more preferably, a preconditioning liquid, wherein the fluid or liquid comprises the non-volatile component. In some embodiments, the preconditioning material comprises a gel, a foam, or a paste wherein the gel, foam, or paste comprises the non-volatile component.

The preconditioning material, e.g., the preconditioning fluid, typically comprises at least one strong solvent (for the polymer(s) used for making the membrane) and/or at least one weak solvent for the polymer(s) and/or at least one non-solvent for the polymer(s) (weak solvents and non-solvents are sometimes referred to as "porogens" or "pore formers").

Preferably, at least one strong solvent, weak solvent and/or non-solvent comprises a non-volatile component. However, as noted above, the preconditioning material can comprise a non-volatile component and a volatile component, and thus, the preconditioning material can comprise at least one of any of the following: a strong solvent, a weak solvent, and a non-solvent, wherein the strong solvent, weak solvent, and/or non-solvent comprises a non-volatile component, and the preconditioning material can further comprise at least one of any of the following: a strong solvent, a weak solvent, and a non-solvent, wherein the strong solvent, weak solvent, and/or non-solvent comprises a volatile component.

Suitable strong solvents include, for example, dimethyl formamide (DMF); N,N-dimethylacetamide (DMAC); N-methylpyrrolidone; tetramethylurea; dioxane; diethyl succinate; dimethylsulfoxide; chloroform; and tetrachloroethane; and mixtures thereof.

Suitable weak solvents and non-solvents include, for example, water; various polyethylene glycols (PEGs; e.g., PEG-400, PEG-1000); various alcohols, especially low alcohols, e.g., methanol, ethanol, isopropyl alchohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; and various salts, such as calcium chloride, magnesium chloride, and lithium chloride; and mixtures thereof.

In some embodiments, particularly those embodiments wherein the preconditioning material is applied to the template in a predetermined pattern, the preconditioning material comprising at least one non-volatile component further comprises at least one volatile component, e.g., a component that can evaporate under membrane preparation conditions.

For example, a preconditioning fluid may comprise a non-volatile component that is a solid at room temperature (e.g., PEG-1000) mixed with a volatile component (e.g., acetone) to form a liquid, paste, or gel. In some embodiments, the volatile component (e.g., acetone) can evaporate (e.g., wherein the PEG-1000 solidifies) after the preconditioning fluid is applied, before coating the preconditioned template with the polymer solution.

The preconditioning material can have any suitable concentration of strong solvent(s), weak solvent(s), and/or non-solvent(s). Illustratively, in some embodiments, increasing the concentration of strong and/or weak solvent(s) decreases the speed of the phase inversion process and the resultant membrane has larger pores, and increasing the concentration of non-solvent(s) increases the speed of the phase inversion process and the resultant membrane has smaller pores.

The preconditioning material can further comprise at least one component for providing one or more desired functions and/or characteristics to the resultant membrane, e.g., one or more of the following: a solid such as, for example, sodium bicarbonate or sodium chloride (e.g., that may be leached out resulting in a pore); a component for providing an antimicrobial function, such as a bacteriostatic or bacteriocidal function (for example, by including a silver-based reagent, e.g., silver nitrate); providing a charge such as a negative charge (e.g., for adsorbing negatively charged target entities such as bacteria, mammalian cells, free nucleic acids, proteins (under certain pH environments) and drugs such as heparin); a positive charge (e.g., for adsorbing positively charged target entities such as proteins (under certain pH environments) and drugs such as dopamine); a zwitterion; and a mixed charge; providing a chelation function (e.g., by including a chelating polymer such as polyacrylic acid, polyvinylsulfonic acid, and sulfonated polystyrene, for example, for adsorbing heavy metals); including a denrimer (e.g., polyamidoamine (PAMAM) for binding pharmaceutically active compounds, including drug metabolites from blood samples); including liposomes (e.g., for carrying/delivering a desired material such as a drug, for example, providing a membrane-based medicinal skin patch); and including a functionalized bead and/or sorbent such as a chromatography sorbent, an affinity sorbet (such as antibodies, antibody fragments, enzymes, e.g., for adsorbing targets such as proteins and/or endotoxins), an activated sorbent (such as activated carbon, activated silica, and activated alumina). Advantageously, by including the component(s) as part of the preconditioning material, the desired function(s) and/or characteristic(s) can be provided, if desired, to a desired portion and/or side of the membrane, rather than throughout the entire membrane. For example, the desired function(s) and/or characteristic(s) can be localized to the portion of the membrane contacted by the preconditioning material, or, for example, the portion of the membrane contacted by the preconditioning material can have a higher concentration of the desired function(s) or characteristic(s) than the other portions of the membrane surface facing the preconditioning material. Additionally, for example, a casting solution can be used to provide a membrane with one or more desired functions and/or characteristics (e.g., a desired charge), and the preconditioning material can comprise a component so that a desired function and/or characteristic can be localized on the membrane, e.g., the charged membrane can include a localized different function and/or characteristic such as one or more of the functions or characteristics listed above (e.g., chelation function).

Embodiments of the invention include membranes with a plurality of asymmetric sections, wherein at least two sections, and in some embodiments, at least three sections, have different asymmetries. For example, in one embodiment, wherein the first surface has at least a first portion and a second portion, the first portion having a first pore structure extending from the first portion into the interior bulk, and the second portion having a second pore structure extending from the second portion into the interior bulk, a first asymmetric section comprises the first portion having the first pore structure extending from the first portion into the interior bulk, and the second asymmetric section comprises the second portion having the second pore structure extending from the second portion into the interior bulk. In some embodiments, a third asymmetric section comprises a region of the interior bulk extending to the second surface of the membrane.

An asymmetric section has a pore structure (typically, a mean pore size) varying throughout the section. Typically, the mean pore size decreases in size from one portion or surface to another portion or surface (e.g., the mean pore size decreases from the upstream portion or surface to the downstream portion or surface). However, other types of asymmetry are encompassed by embodiments of the invention, e.g., the pore size goes through a minimum pore size at a position within the thickness of the asymmetric section (e.g., a portion of an asymmetric section can have an "hourglass-type" pore structure). An asymmetric section can have any suitable pore size gradient or ratio, e.g, about 3 or more, or about 7 or more. This asymmetry can be measured by comparing the mean pore size on one major surface of a section with the mean pore size of the other major surface of that section.

The preconditioning material can be applied to the substrate (e.g., applied a substrate having a predetermined geometry, or applied to the substrate in a pattern) by a variety of techniques, e.g., slot-die coating, dip coating, spray coating, meniscus coating, printing, powder coating, applying a coated mesh to the substrate, and the like.

Once the template has been preconditioned in accordance with the invention, any one or more of the following: casting a polymer solution over the preconditioned template; casting one or more polymer solutions over the previously cast polymer solution; precipitating the cast polymer solution(s); separating the membrane from the template; leaching the membrane; and, drying the membrane or keeping the membrane wet, can be carrried out as is known in the art, and suitable reagents, ingredients, and solutions (e.g., polymer solutions and casting solutions), can be carried out as is known in the art.

A variety of polymer solutions are suitable for use in the invention, and are known in the art. Suitable polymer solutions can include, polymers such as, for example, polyaromatics; sulfones (e.g., polysulfones, including aromatic polysulfones such as, for example, polyethersulfone, polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles (including polyalkylacrylonitriles), cellulosic polymers (such as cellulose acetates and cellulose nitrates), fluoropolymers, and polyetherether ketone (PEEK). Polymer solutions can include a mixture of polymers, e.g., a hydrophobic polymer (e.g., a sulfone polymer) and a hydrophilic polymer (e.g., polyvinylpyrrolidone).

In addition to one or more polymers, typical polymer solutions comprise at least one solvent, and may further comprise at least one non-solvent. Suitable solvents include, for example, dimethyl formamide (DMF); N,N-dimethylacetamide (DMAC); N-methyl pyrrolidone (NMP); methyl sulfoxide, tetramethylurea; dioxane; diethyl succinate; dimethylsulfoxide (DMSO); chloroform; and tetrachloroethane; and mixtures thereof. Suitable nonsolvents include, for example, water; various polyethylene glycols (PEGs; e.g., PE-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds (e.g., 2,2'-azobis(2-amidinopropane)dihydrochloride (V50)), and combinations thereof), and/or minor ingredients such as surfactants and/or release agents.

The membrane is preferably prepared by a phase inversion process over the preconditioned template. Without being limited to any particular mechanism, it is believed that the combination of the preconditioning material and the template substrate, which locates the preconditioning material with respect to the cast polymer solution, regulates the phase inversion process from the template surface to the interior of the membrane.

Typically, the phase inversion process involves casting or extruding a polymer solution into a thin film, and precipitating the polymer through one or more of the following; (a) evaporation of the solvent and nonsolvent, (h) exposure to a non-solvent vapor, such as water vapor, which absorbs on the exposed surface, (c) quenching in a non-solvent liquid (e.g., a phase immersion bath containing water, and/or another non-solvent), and (d) thermally quenching a hot film so that the solubility of the polymer is suddenly greatly reduced. Phase inversion can be induced by the wet process (immersion precipitation), vapor induced phase separation (VIPS), thermally induced phase separation (TIPS), quenching, dry-wet casting, and solvent evaporation (dry casting). Dry phase inversion differs from the wet or dry-wet procedure by the absence of immersion coagulation. In these techniques, an initially homogeneous polymer solution becomes thermodynamically unstable due to different external effects, and induces phase separation into a polymer lean phase and a polymer rich phase. The polymer rich phase forms the matrix of the membrane, and the polymer lean phase, having increased levels of solvents and non-solvents, forms the pores.

In one illustrative technique, a casting solution (polymer solution) containing the polymer, a solvent, a pore former, a wetting agent, and optionally a small quantity of a non-solvent is prepared by combining and mixing the ingredients, preferably at an elevated temperature. The resulting solution is filtered to remove any impurities. In accordance with an embodiment of the invention, the casting solution is cast or extruded onto the preconditioned template substrate in the form of a sheet. Optionally, one or more additional casting solutions are cast over the previously cast solution(s). The resulting sheet is allowed to set or gel as a phase inverted membrane. The set membrane can be separated from the template and leached to remove the solvent and other soluble ingredients (alternatively, the set membrane can be removed from the template before or during leaching). The separated membrane can be dried, or kept wet.

If desired, composite and/or dual cast membranes can be provided in accordance with embodiments of the invention, wherein one layer or membrane comprises an embodiment of the membrane as described above, in combination with at least one other layer or membrane. A variety of casting techniques, including dual casting techniques, are known in the art and are suitable. Preferably, the two or more layers are cast before phase inversion. A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot.

The present invention further provides a device, e.g., a filter device, chromatography device and/or a membrane module comprising one or more membranes of the present invention. The device can be in any suitable form. For example, the device can include a filter element comprising the membrane in a substantially planar, pleated, or spiral form. In an embodiment, the element can have a hollow generally cylindrical form. If desired, the device can include the filter element in combination with upstream and/or downstream support or drainage layers. The device can include a plurality of membranes, e.g., to provide a multilayered filter element, or stacked to provide a membrane module, such as a membrane module for use in membrane chromatogaphy. Filter cartridges can be constructed by including a housing and endcaps to provide fluid seal as well as at least one inlet and at least one outlet. The devices can be constructed to operate in crossflow or tangential flow mode as well as dead-end mode. Accordingly, the fluid to be treated can be passed, for example, tangentially to the membrane surface (e.g., wherein at least one component and/or portion of the fluid passes through the membrane, and at least one other component and/or portion of the fluid passes tangentially to the upstream surface of the membrane), or passed perpendicularly to the membrane surface such that the fluid passes through the membrane. Either the first or the second surface can be the upstream surface, i.e., the first surface facing the fluid to be treated, when operating in any of the filtration modes.

Membranes according to embodiments of the invention can be used in a variety of applications, including, for example, sterile filtration applications, filtering fluids for the electronics industry, filtering fluids for the pharmaceutical industry, filtering fluids for the food and beverage industry, clarification, filtering antibody- and/or protein-containing fluids, and/or filtering cell culture fluids.

The following examples further illustrate the invention but, of course, should not be construed as in any way limiting its scope. These examples show membranes having localized asymmetries can be prepared using a variety of template substrates with or without predetermined geometries complementary to the desired localized asymmetries, wherein the templates are preconditioned with a preconditioning material before casting a polymer solution over the preconditioned template.

In each of Examples 1-7 and 9-13, a polymer solution is cast once.

Example 1

This example demonstrates the preparation of two membranes according to an embodiment of the invention, using a template substrate having a predetermined geometry.

The substrate is embossed polypropylene (BP100P, 5.0 mils; Bloomer Plastics Inc., Bloomer, Wis.), which is treated with PEG-400 (liquid at room temperature, viscosity at 25° C.=90 cP; boiling point 250° C.) to provide a preconditioned template. A polymer solution including polyether sulfone (PES) as generally described in U.S. Pat. No. 4,964,990, is cast on the preconditioned template, and the polymer is precipitated by vapor induced phase separation. The polymer solution temperature and casting temperatures are 37° C., the air velocity is 300 linear feet/minute, the air temperature is 24° C., and the relative humidity is 75%. The formation time is about 10 minutes. The membrane is leached, separated from the template, and dried.

Figure 1:
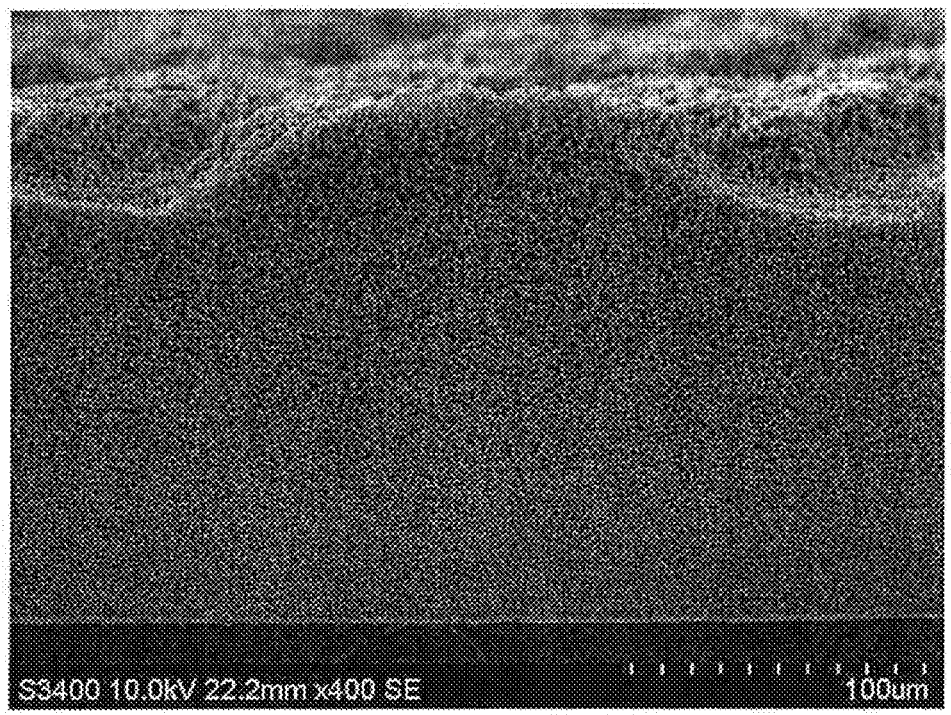

FIG. 1 is a scanning electron micrograph (SEM) showing a cross-sectional view showing first and second portions of the first surface of the membrane, the two portions having different pore structures, wherein the first surface has localized asymmetry complementary to the predetermined geometry of the template, wherein the SEM also shows the second surface of the membrane.

Figure 2:
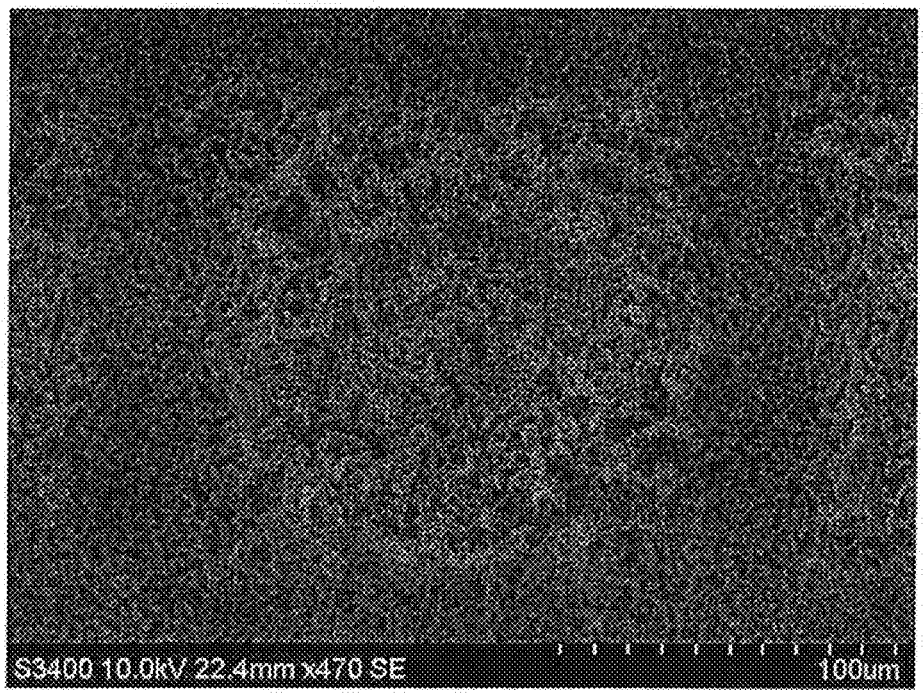
FIG. 2 is a top view of a portion of a top surface of a membrane according to another embodiment of the present invention.

FIG. 2 is an SEM showing a top view of the membrane, showing first and second portions of the first surface, wherein the first surface has localized asymmetry complementary to the predetermined geometry of the template.

The mean pore size of the pores in the first portion of the first surface (the portion of the membrane contacting the preconditioned substrate during membrane formation as determined by the SEM photo is about 20 μm (the first mean pore size), and the mean pore size of the pores in the second portion of the first surface (the portion of the membrane not contacting the preconditioned substrate during membrane formation as determined by the SEM photo is about 0.5 μm (the second mean pore size), providing a ratio of 40:1.

The mean pore size of the pores in the second surface as determined by the SEM photo is about 0.2 μm (the third mean pore size), both in the portion of the second surface opposing the first portion of the first surface, and the portion of the second surface opposing the second portion of the first surface. The ratio of the mean pore size of the pores in the first portion of the first surface to the mean pore size of the pores in the second surface is 100:1, and the ratio of the mean pore size of the pores in the second portion of the first surface to the mean pore size of the pores in the second surface is 2.5:1.

The thickness between the first portion of the first surface and the second surface is about 20% greater than the thickness between the second portion of the first surface and the second surface.

Example 2

This example demonstrates the preparation of a membrane according to an embodiment of the invention, using another template substrate having a predetermined geometry.

The substrate is a woven fabric having a pattern of 1,600 raised regions per square inch (Saatifil 105/52; SaatiTech, Shawnee, Kans.), which is treated with PEG-400 to provide a preconditioned template. A polymer solution including PES is cast on the preconditioned template, and the polymer is precipitated by vapor induced phase separation. The membrane is leached, separated from the template, and dried.

Figure 3:
FIG. 3 is a cross-sectional view of a membrane according to another embodiment of the present invention, showing the top surface in particular.

FIG. 3 is a scanning electron micrograph (SEM) showing a cross-sectional view showing first and second portions of the first surface, the two portions having different pore structures, wherein the first surface has localized asymmetry complementary to the predetermined geometry of the template.

Example 3

This example demonstrates the preparation of a membrane according to an embodiment of the invention, using another template substrate (a flat substrate) that is preconditioned with a preconditioning material to provide a casting surface comprising a predetermined geometry.

The substrate is flat stainless steel. A paste containing PEG-1000 (solid at 25° C. or less; viscosity in 50% aqueous solution=20 cp) mixed with acetone is printed onto the stainless steel in a predetermined pattern and provides a preconditioned template. A polymer solution including PES is cast on the preconditioned template, and the polymer is precipitated by vapor induced phase separation. The membrane is leached, separated from the template, and dried.

FIG. 4 is a scanning electron micrograph (SEM) showing a cross-sectional view showing first and second portions of the first surface, the two portions having different pore structures, wherein the first surface is essentially flat.

The mean pore size of the pores in the first portion of the first surface as determined by the SEM photo is about 5 μm, and the mean pore size of the pores in the second portion of the first surface as determined by the SEM photo is about 0.5 μm, providing a ratio of 10:1.

The mean pore size of the pores in the second surface as determined by the SEM photo is about 0.2 μm, both in the portion of the second surface opposing the first portion of the first surface, and the portion of the second surface opposing the second portion of the first surface. The ratio of the mean pore size of the pores in the first portion of the first surface to the pores in the second surface is 25:1, and the ratio of the mean pore size of the pores in the second portion of the first surface to the pores in the second surface is 2.5:1.

Example 4

This example demonstrates the preparation of a membrane according to an embodiment of the invention, using another template substrate having a predetermined geometry.

The substrate is embossed polypropylene as described in Example 1, which is treated with propanol to provide a preconditioned template. A polymer solution including cellulose is cast on the preconditioned template, and the polymer is precipitated by solvent evaporation. The membrane is leached, separated from the template, and dried.

FIG. 5 is a scanning electron micrograph (SEM) showing a cross-sectional view showing first and second portions of the first surface, the two portions having different pore structures, wherein the first surface has localized asymmetry complementary to the predetermined geometry of the template.

The mean pore size of the pores in the first portion of the first surface as determined by the SEM photo is about 5 μm, and the mean pore size of the pores in the second portion of the first surface as determined by the SEM photo is about 0.5 μm, providing a ratio of 10:1.

The mean pore size of the pores in the second surface as determined by the SEM photo is about 0.2 μm, both in the portion of the second surface opposing the first portion of the first surface, and the portion of the second surface opposing the second portion of the first surface. The ratio of the mean pore size of the pores in the first portion of the first surface to the pores in the second surface is 25:1, and the ratio of the mean pore size of the pores in the second portion of the first surface to the pores in the second surface is 2.5:1.

Example 5

This example demonstrates the preparation of a membrane according to an embodiment of the invention, using another template substrate having a predetermined geometry.

The substrate is embossed polypropylene as described in Example 1, which is treated with DMAC to provide a preconditioned template. A polymer solution including PVDF is cast on the preconditioned template, and the polymer is precipitated by quenching. The membrane is leached, separated from the template, and dried.

FIG. 6 is a scanning electron micrograph (SEM) showing a top view showing first and second portions of the first surface, wherein the first surface has localized asymmetry complementary to the predetermined geometry of the template.

The mean pore size of the pores in the first portion of the first surface as determined by the SEM photo is about 5 μm, and the mean pore size of the pores in the second portion of the first surface as determined by the SEM photo is about 0.5 μm, providing a ratio of 10:1.

The mean pore size of the pores in the second surface as determined by the SEM photo is about 0.2 μm, both in the portion of the second surface opposing the first portion of the first surface, and the portion of the second surface opposing the second portion of the first surface. The ratio of the mean pore size of the pores in the first portion (the first mean pore size) of the first surface to the mean pore size of the pores in the second surface is 25:1, and the ratio of the mean pore size of the pores in the second portion (the second mean pore size) of the first surface to the pores in the second surface is 2.5:1.

Example 6

This example demonstrates the preparation of a membrane according to an embodiment of the invention, using another template substrate having a predetermined geometry.

The substrate is a woven fabric as described in Example 2, which is treated with DMF (boiling point 153° C.) to provide a preconditioned template. A polymer solution including PES is cast on the preconditioned template, and the polymer is precipitated by vapor induced phase separation. The membrane is leached, separated from the template, and dried.

FIG. 7 is a scanning electron micrograph (SEM) showing a cross-sectional view showing first and second portions of the first surface, wherein the first surface has localized asymmetry complementary to the predetermined geometry of the template.

Example 7

This example demonstrates the improved throughput/reduced fouling using a membrane according to embodiments of the invention compared to conventional asymmetric membranes. The results are shown in FIG. 8.

A membrane is produced as described in Example 1 (represented by the symbol "■" in FIG. 8). The membrane is 8 mils thick, having a water bubble point of 70 psi, and a water flow rate of 37 ml/min.

Additionally, 3 membranes are obtained: A polyethersulfone symmetrical 0.2 µm pore size membrane, 6.5 mil thick, water bubble point 63 psi, water flow rate 25 ml/min (SUPOR® 200WE4; Pall Corporation, East Hills, N.Y.) (represented by the symbol "∽" in FIG. 8); as well as two polyethersulfone asymmetrical pore size membranes: an 8.4 mil thick, water bubble point 65 psi, water flow rate 49 ml/min asymmetric membrane (SUPOR® machV C200; Pall Corporation, East Hills, N.Y.) (represented by the symbol "▲" in FIG. 8); and a 4.7 mil thick, water bubble point 68 psi, water flow rate 37 ml/min asymmetric membrane (BTS-55; Pall Corporation, East Hills, N.Y.) (represented by the symbol "●" in FIG. 8).

Each of the four membranes is placed on top of a polyethersulfone symmetrical 0.2 µm pore size membrane (SUPOR® 200WE4; Pall Corporation, East Hills, N.Y.) in 47 mm disc stainless steel housings.

A 5% bovine serum albumin (BSA) solution is prepared in deionized water, stirred overnight at room temperature, filtered through a 0.2 µm pore size membrane, and stirred for 18 hours.

BSA is passed through the membranes in the housings using a SciLog® ACCUTec™ System operated in accordance with the manufacturer's instructions, including providing deionized water throughput followed by BSA throughput.

The raw data including time, mass of collected filtrate and pressure from both the water and BSA runs are used to plot graphs such as flux versus time, throughput versus time and flux versus throughput. $V_{max}$ is calculated by taking the average of the last five throughput data points in the throughput versus time graph when the flux decay is >80% from the average of the first five throughput versus time data points. The flux decay is calculated as the difference between the average of five initial flux data points and the last five data points in the flux versus throughput graphs.

As shown in FIG. 8, the membrane according to an embodiment of the invention exhibits higher flux and throughput compared to the other membranes.

Example 8

This example demonstrates a dual-cast membrane according to an embodiment of the invention.

The substrate is embossed embossed polypropylene (as described in Example 1), which is treated with PEG-400 to provide a preconditioned template. A first polymer solution including PES (less than 10% PES solids content) is cast on the preconditioned template, and a second polymer solution including PES (greater than 10% PES solids content) is cast on the first polymer solution. The solutions are precipitated by moisture induced phase separation. The membrane is leached, separated from the template, and dried.

FIG. 9 is a scanning electron micrograph (SEM) of a cross-sectional view of the dual layer membrane, showing first and second portions of the first surface of the first layer, the two portions having different pore structures, wherein the first surface has localized asymmetry complementary to the predetermined geometry of the template, and also showing the second layer.

Example 9

This example demonstrates a membrane according to an embodiment of the invention can include silver, providing a bacteriostatic or bacteriocidal membrane.

The substrate is embossed polypropylene (as described in Example 1), which is treated with a solution including PEG-400 and NMP (1:1 PEG:NMP) having silver powder (5%, 1-3 µm) added thereto, to provide a preconditioned template. A polymer solution including PES is cast on the preconditioned template, and the polymer is precipitated. The membrane is leached, separated from the template, and dried.

Energy-dispersive X-ray Spectroscopy (EDS) is carried out, and it shows that silver is present in the surface of the membrane having the localized asymmetry complementary to the predetermined geometry of the substrate, and is present at a higher concentration than at the other surface of the membrane.

Example 10

This example demonstrates a membrane according to an embodiment of the invention, including silver, provides a bacteriocidal membrane.

The substrate is embossed polypropylene (CH200CN, 3.4 mils; Bloomer Plastics Inc., Bloomer, Wis.), which is treated with a solution including PEG-400 and NMP (1:1 PEG:NMP) having silver powder (5%, 0.5-1 µm) added thereto, to provide a preconditioned template. A polymer solution including PES is cast on the preconditioned template, and the polymer is precipitated. The membrane is leached, separated from the template, and dried. The membrane has a 0.2 µm pore size.

Energy-dispersive X-ray Spectroscopy (EDS) is carried out, and it shows that silver is present in the surface of the membrane having the localized asymmetry complementary to the predetermined geometry of the substrate, and is present at a higher concentration than at the other surface of the membrane.

A microorganism recovery test is carried out with a challenge organism, using a commercially available 0.45 pore size mixed cellulose membrane, a membrane prepared as discussed above, and a control membrane prepared as generally described in this example, wherein the substrate is treated with a solution including PEG-400 and NMP, but without silver powder.

The results show that the mixed cellulose membrane allows defined colony growth, the control membrane allows uniform colony growth across the surface, and the membrane including silver does not allow any colony growth.

Example 11

This example demonstrates a membrane according to an embodiment of the invention can include a positive charge, e.g., for use in removing negatively charged materials in a fluid.

The substrate is embossed polypropylene (as described in Example 1), which is treated with a solution prepared as follows: 1.0 G Gafquat-755N (CAS: 53633-54-8) is dissolved into 5.0 g deionized water. 0.8 g PEI-750 (CAS: 9002-98-6) is dissolved into 30.0 g NMP (CAS: 874-50-2). The two solutions are combined and mixed, and 0.4 g Heloxy-67 (CAS: 2425-79-8) is added. The substrate is treated with the resultant solution to provide a preconditioned template. A polymer solution including PES is cast on the preconditioned template, and the polymer is precipitated. The membrane is leached, separated from the template, and dried.

The membrane is submerged for 15 minutes in a negatively charged dye solution (Metanil Yellow Dye, 10 ppm in deionized water). Digital microscope photos show the dye is present in the surface of the membrane having the localized asymmetry complementary to the predetermined geometry of the substrate, and is present at a higher concentration than at the other surface of the membrane.

Example 12

This example demonstrates a membrane according to an embodiment of the invention can include a positive charge, e.g., for use in removing negatively charged materials in a fluid.

The substrate is embossed polypropylene (as described in Example 10), which is treated with a solution prepared as described in Example 11. The substrate is treated with the resultant solution.

A polymer solution including PES is cast on the preconditioned template, and the polymer is precipitated. The membrane is leached, separated from the template, and dried. The membrane has a 0.2 μm pore size.

The membrane is submerged for 60 minutes in a negatively charged dye solution (Metanil Yellow Dye, 10 ppm in deionized water). The membrane is leached in a solution of deionized water and methanol (water:ethanol 40:60), followed by deionized water leaching and drying.

Digital microscope photos show the dye is present in the surface of the membrane having the localized asymmetry complementary to the predetermined geometry of the substrate, and is present at a higher concentration than at the other surface of the membrane.

Additionally, FTIR analysis of a control membrane and a membrane with a positive charge show the control membrane lacks cationic functionality and the membrane with a positive charge has cationic functionality.

Example 13

This example demonstrates a membrane according to an embodiment of the invention can include a negative charge, e.g., for use in removing positively charged materials in a fluid.

The substrate is embossed polypropylene (as described in Example 10), which is treated with a solution prepared as follows: 2-Acrylamido-2-methyl propanesulfonic acid, hydroxypropyl acrylate, N-(isobutoxymethyl) acrylamide, 2,3-dibromopropanol, ammonium persulfate, sodium metabisulfite, and dextran, deionized water, and methanol, forming a 6% solution, is combined with NMP (CAS: 874-50-2) in a 6:1 ratio. The substrate is treated with the resultant solution.

A polymer solution including PES is cast on the preconditioned template, and the polymer is precipitated. The membrane is leached, separated from the template, and dried. The membrane has a 0.2 μm pore size.

The membrane is submerged for 60 minutes in a negatively charged dye solution (Methylene Blue, 10 ppm in deionized water). The membrane is leached in a solution of deionized water and methanol (water:ethanol 40:60), followed by deionized water leaching and drying.

Digital microscope photos show the dye is present in the surface of the membrane having the localized asymmetry complementary to the predetermined geometry of the substrate, and is present at a higher concentration than at the other surface of the membrane.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as pet miffed by applicable law. Moreover, any combination of the above-described elements in all possible variations thereof is encompassed by the invention unless otherwise indicated herein or otherwise clearly contradicted by context.

The invention claimed is:

1. An asymmetric microporous membrane comprising a first surface and a second surface, an interior bulk defined by the first and second surfaces, and a first asymmetric section and a second asymmetric section, wherein the first surface has at least a first portion and a second portion, the first asymmetric section comprising the first portion having a first porosity extending from the first portion into the interior bulk, the interior bulk having a first asymmetric pore structure, the first porosity comprising a first mean pore size, and the second asymmetric section comprising the second portion having a second porosity extending from the second portion into the interior bulk, the interior bulk having a second asymmetric pore structure that is different than the first asymmetric pore structure, the second porosity comprising a second mean pore size, wherein the ratio of first mean pore size to the second mean pore size is at least about 5:1.

2. The asymmetric microporous membrane of claim 1, wherein the ratio of first mean pore size to the second mean pore size is at least about 25:1.

3. The asymmetric microporous membrane of claim 1, wherein the ratio of first mean pore size to the second mean pore size is at least about 40:1.

4. The asymmetric microporous membrane of claim 1, wherein the first surface has a plurality of first regions and second regions.

5. The asymmetric microporous membrane of claim 1, wherein the first surface has a predetermined pattern comprising the first region and the second region.

6. The asymmetric microporous membrane of claim 1, wherein the second surface has a third porosity, comprising a third mean pore size, wherein the ratio of the first mean pore size to the third mean pore size is at least about 100:1.

7. The asymmetric microporous membrane of claim 1, wherein the second surface has a third porosity, comprising a third mean pore size, wherein the third mean pore size is at least about 10 times less than the first mean pore size and/or the third mean pore size is at least about two times less than the second mean pore size.

8. The asymmetric microporous membrane of claim 1, wherein the distance between the first region of the first surface and the second surface is at least about 10 percent greater than the distance between the second region of the first surface and the second surface.

9. The asymmetric microporous membrane of claim 1, wherein the membrane comprises a bacteriostatic or bacteriocidal membrane.

10. The asymmetric microporous membrane of claim 1, wherein the membrane comprises a positively charged membrane.

11. The asymmetric microporous membrane of claim 1, wherein the membrane comprises a negatively charged membrane.

12. A method of making the asymmetric microporous membrane of claim 1, the asymmetric microporous membrane having localized asymmetries, the method comprising:
(a) obtaining a template having a predetermined geometry complementary to the localized asymmetries;
(b) applying a preconditioning fluid to the template to provide a preconditioned template;
(c) casting a first polymer solution over the preconditioned template;
(d) optionally casting a second polymer solution over the first polymer solution;
(e) precipitating the first polymer solution and the second polymer solution if present to provide the asymmetric microporous membrane; and
(f) separating the asymmetric microporous membrane from the template.

13. A method of making the asymmetric microporous membrane of claim 1, the asymmetric microporous membrane having localized asymmetries, the method comprising:
(a) obtaining a template;
(b) applying a preconditioning fluid in a predetermined pattern to the template to provide a preconditioned template having a predetermined geometry complementary to the localized asymmetries;
(c) casting a first polymer solution over the preconditioned template;
(d) optionally casting second polymer solution over the first polymer solution;
(e) precipitating the first polymer solution and the second polymer solution if present to provide the asymmetric microporous membrane; and
(f) separating the asymmetric microporous membrane from the template.

14. The method of claim 12, wherein the preconditioning fluid includes at least one component for providing at least one of the following to the asymmetric microporous membrane: an antimicrobial function and a charge.

15. The method of claim 12, further comprising at least one of:
(g) leaching the asymmetric microporous membrane, and
(h) drying the asymmetric microporous membrane.

16. A method of processing a fluid, the method comprising: passing the fluid through the asymmetric microporous membrane of claim 1.

17. A method of processing a fluid, the method comprising: passing the fluid tangentially to the first surface of the asymmetric microporous membrane of claim 1.

18. A method of processing a fluid, the method comprising: passing the fluid tangentially to the second surface of the asymmetric microporous membrane of claim 1.

19. The asymmetric microporous membrane of claim 2, wherein the first surface has a plurality of first regions and second regions.

20. An asymmetric microporous membrane comprising a first surface and a second surface and an interior bulk defined by the first and second surfaces, wherein the first surface has plurality of first regions and second regions in a predetermined pattern, the first regions having a first porosity comprising a first mean pore size wherein a first asymmetric pore structure extends from the first region into the interior bulk, the interior bulk having a first asymmetric pore structure, the second regions having a second porosity comprising a second mean pore size wherein a second asymmetric pore structure extends from the second region into the interior bulk, the interior bulk having a second asymmetric pore structure that is different than the first asymmetric pore structure, wherein the ratio of first mean pore size to the second mean pore size is at least about 5:1, and wherein the second surface has a third porosity, comprising a third mean pore size, wherein the ratio of the first mean pore size to the third mean pore size is at least about 100:1.

* * * * *